United States Patent [19]
Greefkes et al.

[11] Patent Number: 5,609,841
[45] Date of Patent: Mar. 11, 1997

[54] METHOD AND APPARATUS FOR TREATING A FLOW OF GAS CONTAINING OXIDIZED SULPHUR COMPOUNDS

[75] Inventors: Johannes Greefkes, Beverwijk; Adrianus J. den Hartog, Oegstgeest, both of Netherlands

[73] Assignee: Hoogovens Staal, B.V., CA Ijmuiden, Netherlands

[21] Appl. No.: 454,310

[22] PCT Filed: Dec. 13, 1993

[86] PCT No.: PCT/EP93/03560

§ 371 Date: Oct. 19, 1995

§ 102(e) Date: Oct. 19, 1995

[87] PCT Pub. No.: WO94/13578

PCT Pub. Date: Jun. 23, 1994

[30] Foreign Application Priority Data

Dec. 17, 1992 [NL] Netherlands .......................... 9202181

[51] Int. Cl.⁶ .......................... B01D 53/48; B01D 53/74
[52] U.S. Cl. .......................... 423/243.01; 423/243.12; 423/539; 423/522; 423/567.1; 423/574.1; 422/161; 422/168; 422/170; 422/172
[58] Field of Search .......................... 423/243.01, 243.12, 423/522, 574.1, 567.1, 539; 422/161, 168, 170, 172, 188

[56] References Cited

U.S. PATENT DOCUMENTS

| | | | |
|---|---|---|---|
| 3,962,405 | 6/1976 | Annesser et al. | 423/242 |
| 4,070,441 | 1/1978 | Pessel | 423/242 |
| 4,091,075 | 5/1978 | Pessel | 423/242 |
| 5,304,361 | 4/1994 | Parisi | 423/220 |

FOREIGN PATENT DOCUMENTS

| | | |
|---|---|---|
| 0217567 | 4/1987 | European Pat. Off. . |
| 2427299 | 12/1979 | France . |
| 57-209808 | 12/1982 | Japan ........ 423/567.1 |
| 120806 | 12/1965 | Netherlands . |
| 7505940 | 11/1976 | Netherlands . |

*Primary Examiner*—Gary P. Straub
*Assistant Examiner*—Timothy C. Vanoy
*Attorney, Agent, or Firm*—Watson Cole Stevens Davis, P.L.L.C.

[57] ABSTRACT

A method of treating a flow of gas containing oxidized sulphur compounds, such as an exhaust gas from coal combustion, comprising the steps of (i) treating the flow of gas to obtain a first component flow containing at least 30% of the total oxidized sulphur compounds and a second component flow containing at least a part of the remainder of the total oxidized sulphur compounds; (ii) converting the first component flow into a concentrated gas containing at least 2.5% by volume of sulphur compounds; (iii) converting oxidized sulphur compounds in the second component flow into hydrogen sulphide; and (iv) supplying the concentrated gas of step (ii) and the hydrogen sulphide of step (iii) to an apparatus for manufacturing either sulfuric acid, sulphur dioxide or elemental sulphur.

11 Claims, 1 Drawing Sheet

5,609,841

METHOD AND APPARATUS FOR TREATING A FLOW OF GAS CONTAINING OXIDIZED SULPHUR COMPOUNDS

TECHNICAL FIELD

The invention relates to a method and apparatus for generating sulphuric acid, condensed sulphur dioxide or elementary sulphur from a flow gas containing oxidized sulphur compounds, such as originates for example from a coal-fired electricity power plant.

BACKGROUND ART

In the operation of a coal-fired electricity plant, there is produced an exhaust gas flow which is contaminated with compounds containing sulphur, in particular oxidized sulphur compounds. In other processes, for example in the manufacture of sinters needed for charging in the blast furnace process in the iron and steel industry, waste gas flows containing also sulphur occur. These waste gas flows represent a significant environmental hazard, in that their release into the atmosphere causes acidification of the environment. Consequently, production installations in which such gas flows occur are usually provided with apparatus for removing the compounds containing sulphur from the gas flow. However, such gas cleaning systems are relatively costly and often just shift the environmental problem from one place to another. One known example of this is the system in which compounds containing sulphur are removed from a waste gas bound to chalk thereby creating a large problem of disposal.

EP-A-217567 is mentioned as describing treatment of a gas containing a large proportion of $SO_2$ to prepare it for the Claus reaction which generates elementary sulphur.

NL-A-7505940 describes concentration of sulphur dioxide from a waste gas containing sulphur dioxide by absorbing the sulphur dioxide and then regenerating a gas flow containing sulphur dioxide at higher concentration. The latter gas flow, before being fed to a Claus reactor, is mixed with a reducing gas which is generated from the waste gas from the Claus reactor.

DISCLOSURE OF THE INVENTION

The object of the invention is to provide a method and apparatus for removing the compounds containing sulphur from a gas flow while avoiding the foregoing environmental and disposal problems, and by which valuable products may be obtained such as sulphuric acid or elementary sulphur.

In accordance with the invention, there is provided a method of treating a flow of gas containing oxidized sulphur compounds to obtain one of sulphuric acid, condensed sulphur dioxide and elementary sulphur, comprising the steps of (i) treating said flow of gas in a wet gas scrubber to obtain therefrom a first component flow from a wet gas scrubber in the form of a flow of water containing at least 30% of the total oxidized sulphur compounds in said flow of gas and a second component gas flow leaving said wet gas scrubber containing at least a part of the remainder of the total oxidized sulphur compounds in said flow of gas;

(ii) treating said flow of water in a degasifier to obtain concentrated gas containing oxidized sulphur compounds in a concentration of at least 2.5% by volume;

(iii) absorbing oxidized sulphur compounds in said second component gas flow in water, and converting the oxidized sulphur compounds therein into hydrogen sulphide; and (iv) supplying said concentrated gas of step (ii) and said hydrogen sulphide of step (iii) to a processing apparatus which manufactures from them one of sulphuric acid, condensed sulphur dioxide and elementary sulphur.

Typically, the second component gas flow contains, except for any leakage losses, all the remainder of the oxidized sulphur compounds left after formation of the first component flow, but in the invention a part of the initial flow of gas may be used later in the process as described below. Such a part is ignored in the calculation of percentage amounts in the component flow herein.

It has been found that from both the standpoint of energy consumption and the standpoint of chemical yield, by the method in accordance with the invention a system can be provided which is advantageous for cleaning waste gas flows containing sulphur and by which, moreover, economically valuable products may be obtained.

The invention is especially suitable for treating gas flows containing contamination with oxidized sulphur compounds at a level below 5% by volume, e.g. in the range 1000 to 9000 ppm.

In another aspect of the invention there is provided apparatus for treating a flow of gas containing oxidized sulphur compounds to obtain one of sulphuric acid, condensed sulphur dioxide and elementary sulphur, comprising (i) a first wet gas scrubber (1) for treating said flow of gas to obtain therefrom a first component flow in the form of a first flow water containing at least 30% of the total oxidized sulphur compounds in said flow of gas and a second component gas flow leaving said wet gas scrubber (1) containing substantially the remainder of the total oxidized sulphur compounds in said flow of gas;

(ii) a degasifier (5) for treating said first flow of water to obtain a concentrated gas containing oxidized sulphur compounds;

(iii) a second wet gas scrubber (2) for treating said second component gas flow leaving said wet gas scrubber (1) to obtain therefrom a second flow of water, and means (3) for converting oxidized sulphur compounds in said second flow of water into hydrogen sulphide; and (iv) means (6) for manufacturing one of sulphuric acid, condensed sulphur dioxide and elementary sulphur from both of said concentrated gas from said means (5) for converting said first component flow and said hydrogen sulphide from said means (3) for converting oxidized sulphur compounds in said second component flow.

In the method, preferably the first component flow containing at least 60% of the total oxidized sulphur compounds present in the initial gas flow, and in step (iv) the processing apparatus serves for the manufacture of sulphuric acid. It has been found to be possible in this manner to achieve a particularly high degree of purity of sulphuric acid thus produced.

The method and apparatus according to the invention use simple means, yet attain a high concentration of the oxidized sulphur compounds present in the initial gas flow. For example, if the content of oxidized sulphur compounds in the initial gas flow may vary in the range between 1000 to 9000 ppm, taken on average the concentration of oxidized sulphur compounds on leaving the degasifier may be increased by a factor of 20.

It is conventional to supply steam to a degasifier as a stripping gas, to be able to carry out the degasification. In a specific embodiment of the invention is it now proposed to supply air or a part of the initial flow of gas as stripping gas. This surprising solution provides a very attractive method in terms of energy consumption, since much energy is required by the steam generation which is conventionally used. Moreover, this method has the advantage that the oxygen requirement in the subsequent processing apparatus for the manufacture of the sulphur products may be reduced.

A water out-flow from the degasifier containing oxidized sulphur compounds may be fed back as supply water for the wet gas scrubber. This achieves further optimisation of operation.

Preferably in the invention, the water in which the second component gas flow fraction is absorbed, is conveyed to an anaerobic reactor for conversion of the dissolved oxidized sulphur compounds into hydrogen sulphide. This hydrogen sulphide is then mixed in the concentrated gas containing oxidized sulphur compounds. Various systems are suitable as a biological anaerobic reactor.

The second component gas flow may comprise at least 40% of the oxidized sulphur compounds present in the initial flow of gas. However it is preferable for this component flow to be adjusted as small as possible, for example so that it comprises no more than 30% of the original oxidized sulphur compounds in the flow of gas. This achieves the advantage that the anaerobic reactor is less loaded and the associated consumption of additives in that reactor is reduced.

Furthermore it is desirable to supply to the anaerobic reactor a flow of water containing oxidized sulphur compounds originating from the degasifier for treating the first component flow. The oxidized sulphur compounds in this water provide an effective source of supply for the anaerobic reactor.

In a specific aspect of the invention the concentrated gas containing oxidized sulphur compounds may be mixed with the hydrogen sulphide and conveyed to a reactor for the manufacture of sulphuric acid, an apparatus for the manufacture of condensed sulphur dioxide, or to a Claus plant for the manufacture of elementary sulphur.

For the first component flow, the degasifier may be operated to advantage at an operating pressure in the 1–1.5 bar range. This achieves the advantage that the concentrated gas flow obtained from the degasifier may be conveyed directly without further treatment to the above-mentioned apparatus for the manufacture of sulphuric acid or elementary sulphur.

BRIEF DESCRIPTION OF DRAWING

The invention will now be further illustrated by way of example reference to the drawing, which has a single FIGURE diagrammatically showing apparatus embodying the invention.

BEST MODE FOR CARRYING OUT THE INVENTION

Figure 1:
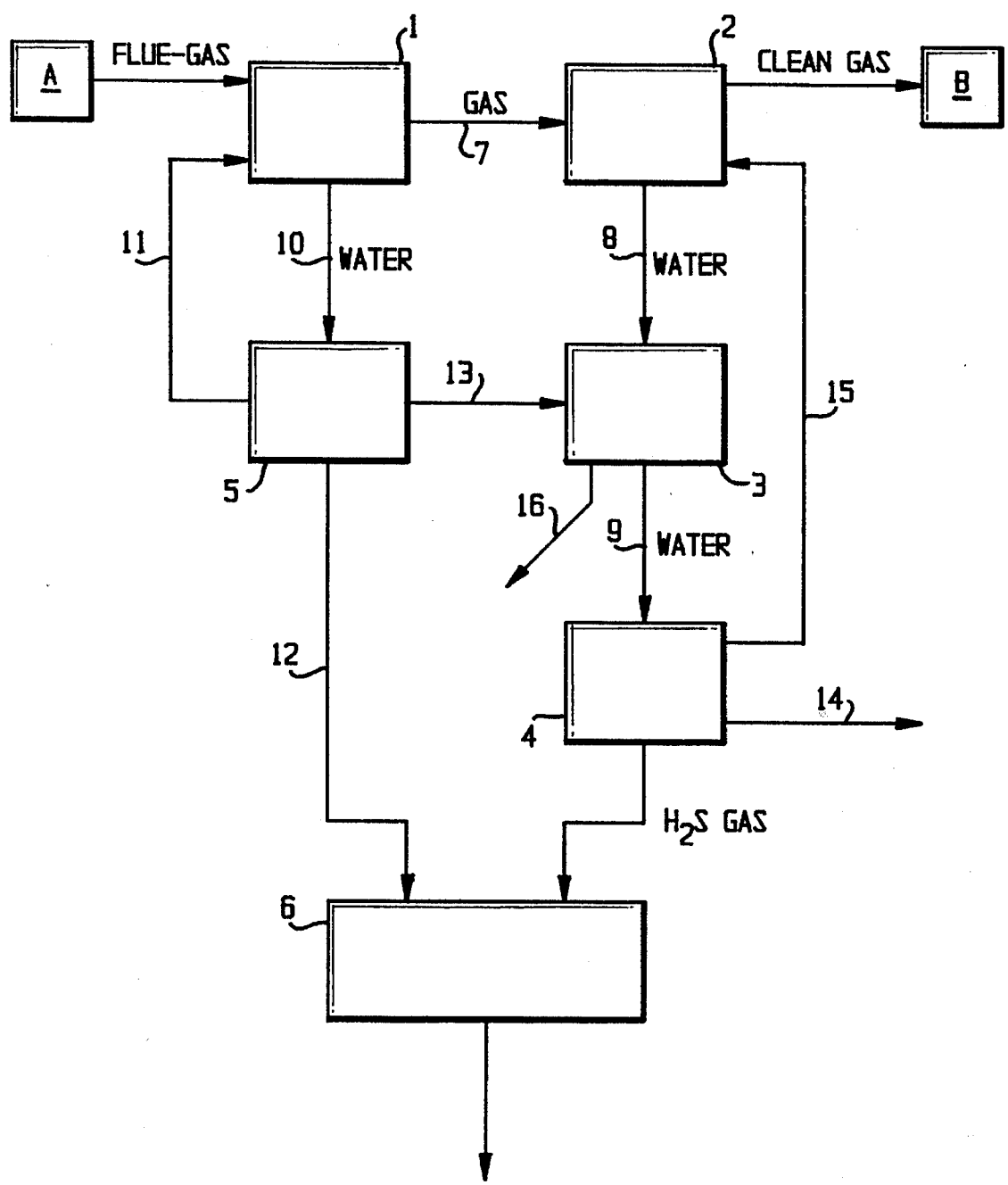

The Figure shows an apparatus in accordance with the invention and by which the method in accordance with the invention may be carried out. In the Figure a gas flow in the form of flue gas following cooling (not shown) originating from installation A is conveyed to a so-called wet gas separator or absorber 1 where the flue gas is separated into two different component flows. A first component flow comprises dissolved in water at least 30%, preferably approximately 60%, and more preferably 70% of the oxidized sulphur compounds present in the flue gas. This first flow component is conveyed via a pipe 10 to a degasifier or stripper 5, in which there is obtained a highly concentrated gas flow which comprises at least 2.5 % vol. oxidized sulphur compounds relative to the total gas flow which leaves the stripper 5 via the pipe 12. The stripper 5 may be operated, for example, with steam, but preference in the invention is given to the use of air or a part of the initial flue gas. With the gas separator 1 adjusted in such a way that the first component flow amounts to at least 30% of the initial sulphur compounds, the method in accordance with the invention is particularly suitable for the manufacture of elementary sulphur. When the first component flow contains 60% or more of the total initial amount of sulphur compounds, it is more appropriate to manufacture sulphuric acid. By the method in accordance with the invention sulphuric acid may be obtained with a very high degree of purity. At the same time the method in accordance with the invention is suitable for the manufacture of condensed sulphur dioxide.

Water exiting from the degasifier 5 is conveyed back via a pipe 11 and added to the wet gas separator 1 as supply water.

The second component flow which comprises the residue of the oxidized sulphur compounds originally present in the flue gas is conveyed via a pipe 7 from the wet gas separator 1 to a second wet gas separator 2 which on the one hand provides sufficiently clean gas that is released into the atmosphere through B, and on the other hand a water flow with the oxidized sulphur compounds absorbed in water in the gas separator 2 dissolved in it. This latter water flow is conveyed via a pipe 8 to an anaerobic reactor 3. At the same time the drained water from the degasifier 5 is conveyed to the anaerobic reactor 3 via a pipe 13. In the anaerobic reactor 3 the oxidized sulphur compounds present in the water convert into hydrogen sulphide ($H_2S$). Then the water with the hydrogen sulphide dissolved in it leaves the reactor 3 via a pipe 9 and sludge deposited in the reactor 3 is discharged via pipe 16.

The reactor 3 is a biological anaerobic reactor, and a suitable example is shown in Dutch patent 166000. The dissolved $SO_x$ (as sulphite or sulphate) is converted to $H_2S$. A feed substrate is supplied to the reactor 3.

The pipe 9 supplies the hydrogen sulphide dissolved in water to a degasifier 4 and the drained water originating from the degasifier 4 is conveyed back via a pipe 15 to the wet gas separator 2 as supply water. Drained water which may be released without hazard to the environment leaves the degasifier 4 via a pipe 14. The gaseous hydrogen sulphide released in the degasifier 4 is mixed with the concentrated gas containing oxidized sulphur compounds from the degasifier 5 and conveyed to an apparatus 6 which is suitable for the manufacture of sulphuric acid, or alternatively, for the manufacture of elementary sulphur. In this latter case a Claus plant, of itself known, may be used for this.

Details of the various components of the apparatus of the Figure need not be given here, since suitable examples are well-known to the process engineer. For example, the wet gas separators 1,2 are open spray towers operating in countercurrent manner. Suitable strippers as the devices 3,5 are well-known and effect removal of the dissolved $SO_x$ from the water into the gas phase. Acidity and temperature of the water are increased, and then the water is contacted with the stripping gas. Sulphuric acid manufacturing plants and Claus plants suitable for the plant 6 are also well-known.

The invention is not limited to the particular embodiment shown, and variations and modifications are possible within the concept of the invention.

We claim:

1. A method of treating a flow of gas containing oxidized sulphur compounds to obtain one of sulphuric acid, condensed sulphur dioxide and elementary sulphur, comprising the steps of (i) treating said flow of gas in a wet gas scrubber to obtain a flow of water containing at least 30% of the total oxidized sulphur compounds in said flow of gas, and a second gas flow containing the remainder of the total oxidized sulphur compounds in said flow of gas;

(ii) treating said flow of water in a degasifier to obtain gas containing sulphur dioxide in a concentration of at least 2.5% by volume;

(iii) contacting said second gas flow with water to absorb oxidized sulphur compounds in said second gas flow in water, and converting the oxidized sulphur compounds therein into hydrogen sulphide; and (iv) supplying the sulfur dioxide containing gas of step (ii) and said hydrogen sulphide of step (iii) to a process which manufactures from them one of sulphuric acid, condensed sulphur dioxide and elementary sulphur.

2. The method according to claim 1, wherein said flow of water contains at least 60% of the total oxidized sulphur compounds in said flow of gas, and in step (iv) sulphuric acid is manufactured.

3. The method according to claim 1, including supplying at least one of air and a part of said flow of gas to said degasifier as a stripping gas therefor.

4. The method according to claim 1, including supplying a regenerate water outflow containing oxidized sulphur compounds from said degasifier to said wet gas scrubber.

5. The method according to claim 1, comprising in step (iii) converting of the oxidized sulphur compounds absorbed in water into hydrogen sulphide in an anaerobic reactor.

6. The method according to claim 5, including supplying a water outflow containing oxidized sulphur compounds from said degasifier to said anaerobic reactor.

7. The method according to claim 1, wherein said second gas flow contains not more than 30% of the total oxidized sulphur compounds in said flow of gas.

8. The method according to claim 1, wherein said degasifier operates at a pressure ranging from 1 to 1.5 bar.

9. Apparatus for treating a flow of gas containing oxidized sulphur compounds to obtain one of sulphuric acid, condensed sulphur dioxide and elementary sulphur, comprising (i) a first wet gas scrubber (1) for treating said flow of gas to a flow of water containing at least 30% of the total oxidized sulphur compounds in said flow of gas;

(ii) a degasifier (5) for treating said first flow of water to obtain a gas containing oxidized sulphur compounds;

(iii) a second downstream wet gas scrubber (2) for receiving the gas flow from the first wet scrubber (1) containing the remainder of the total oxidized sulphur compounds in said flow of gas and treating said gas flow to obtain therefrom a second flow of water containing oxidized sulfur compounds, and converting means (3) for converting oxidized sulphur compounds in said second flow of water into hydrogen sulphide; and (iv) means (6) for manufacturing one selected from the group selected of sulphuric acid, condensed sulphur dioxide and elementary sulphur from both of the sulfur oxides containing gas from said degasifier (5) and the hydrogen sulphide from said converting means (3).

10. Apparatus according to claim 9, including means for feeding a water outflow from said degasifier (5) to said first wet gas scrubber (1).

11. Apparatus according to claim 10, wherein said converting means (3) for converting said second flow of water comprises an anaerobic reactor for converting oxidized sulphur compounds to hydrogen sulphide.

* * * * *